May 6, 1969 W. G. DERBY ET AL 3,443,070

SYNCHRONIZED TIMING SYSTEM FOR DATA PROCESSING

Filed Oct. 22, 1965 Sheet 1 of 2

United States Patent Office 3,443,070

Patented May 6, 1969

3,443,070

SYNCHRONIZED TIMING SYSTEM FOR DATA PROCESSING

William G. Derby and John R. Nowell, Phoenix, Ariz., assignors to General Electric Company, a corporation of New York Filed Oct. 22, 1965, Ser. No. 501,195
Int. Cl. G06f 7/38; G06g 7/12
U.S. Cl. 235—92 9 Claims

ABSTRACT OF THE DISCLOSURE

A synchronized timing system for data processing employs a master oscillator and a pair of frequency divider circuits to control the phase relationship of timing signals having different frequencies.

Figure 1:
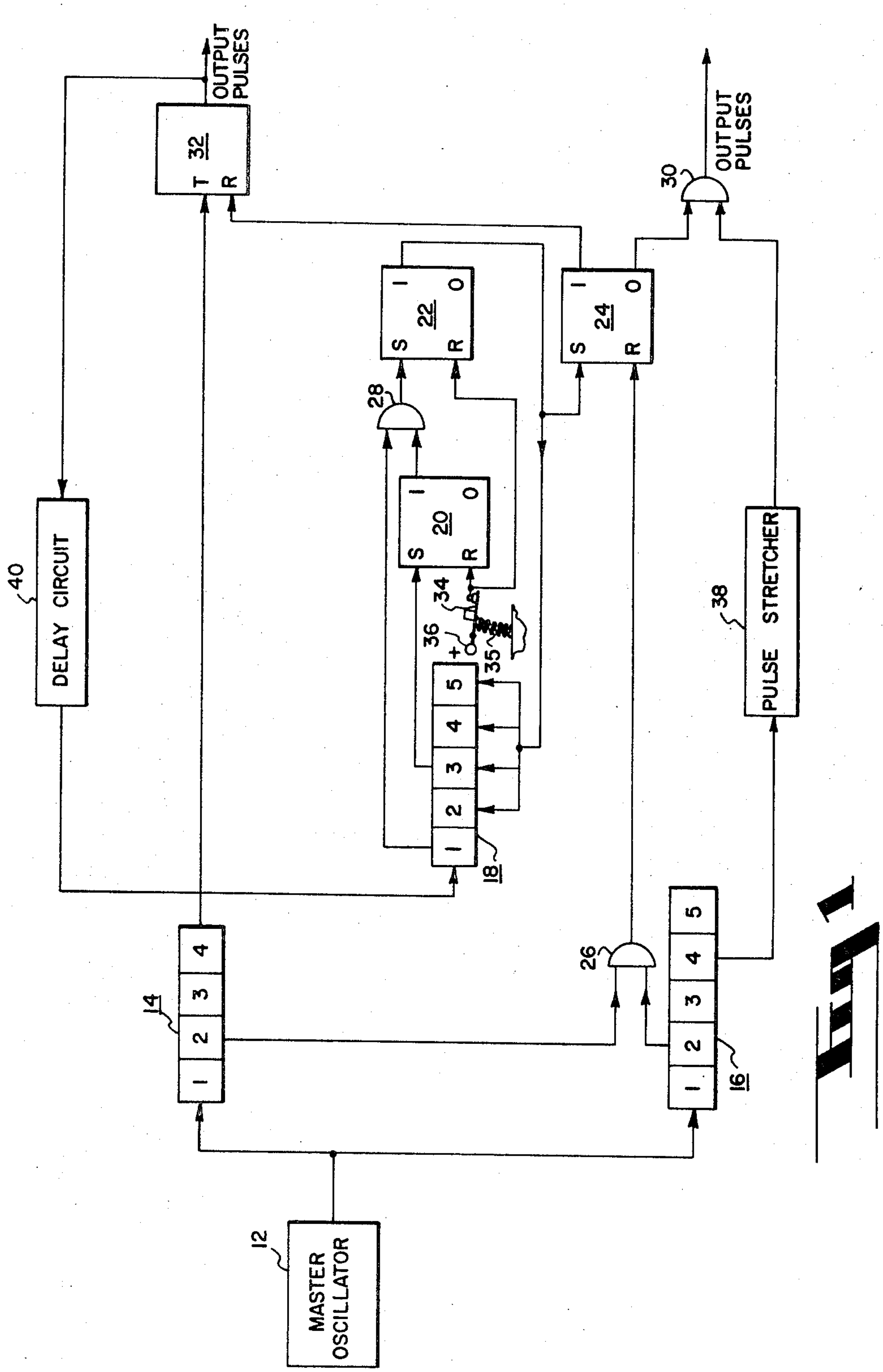

This invention relates to data processing systems and more particularly to an arrangement for use in such systems for controlling the phase relationship of timing signals having different frequencies.

The computer is a significant aid in obtaining timely and efficient business management information and its primary value lies in its ability to digest large volumes of data, perform logical operations on the data, and make decisions based on established criteria. This ability has stimulated a desire on management's part to expand operations further by real time processing of the data from many remote facilities such as factories, warehouses, sales offices, and distribution centers.

Data in the form of binary digits (bits) collected at remote terminals is transmitted over communication lines such as our nation's common and private carrier wire lines, cable carriers, radio and microwave facilities to a terminal device near the data processor. Data from this terminal device and other types of well-known peripheral equipment is then transferred to the data processor.

The feeding of data between the data processor and other parts of the system gives rise to substantial problems. One of these problems is the accurate synchronization of timing signals in various parts of the processing system. Timing signals are employed, for example, in transferring data into and out of a memory of the data processor. Other timing signals are used to transfer data between various peripheral devices or parts thereof. In some systems, the timing signals employed in the data processor and the timing signals employed in the peripheral devices associated therewith have different frequencies. It is essential that the phase relationship of these various timing frequencies be synchronized in order to obtain speed and accuracy in the transfer of information between the data processor and its associated peripheral equipment. Further, any starting or stopping of the pulse generator used to produce these timing signals must be accurately controlled so that a controlled number of binary digits may be transferred into or out of the memory of the data processor in a given time.

Accordingly, it is an object of this invention to provide a novel timing arrangement for synchronizing the transfer of information between two sections of a data processing system operating at different timing frequencies.

Another object of this invention is to provide a novel system for controlling the phase relationship of timing signals having different frequencies.

A further object of this invention is to provide a new timing arrangement in which timing pulses of various frequencies start and stop at the same phase position.

Further objects and advantages of the present invention will become apparent to those skilled in the art as the description thereof proceeds.

Briefly, in accordance with one embodiment of the present invention, a timing system is provided for data processing systems which utilizes a master oscillator for providing synchronized timing signals having different timing frequencies. A pair of frequency divider circuits coupled to the master oscillator are disclosed each generating a train of pulses called clock or timing pulses having a different repetition rate. The first timing frequency is utilized by the data processor and the second timing frequency or repetition rate of the pulses is utilized by the associated peripheral equipment. Additional circuitry is employed for enabling and disabling the frequency divider circuits so that a predetermined number of bits may be transferred into and out of the memory of the data processor as required.

Figures 2, 3:
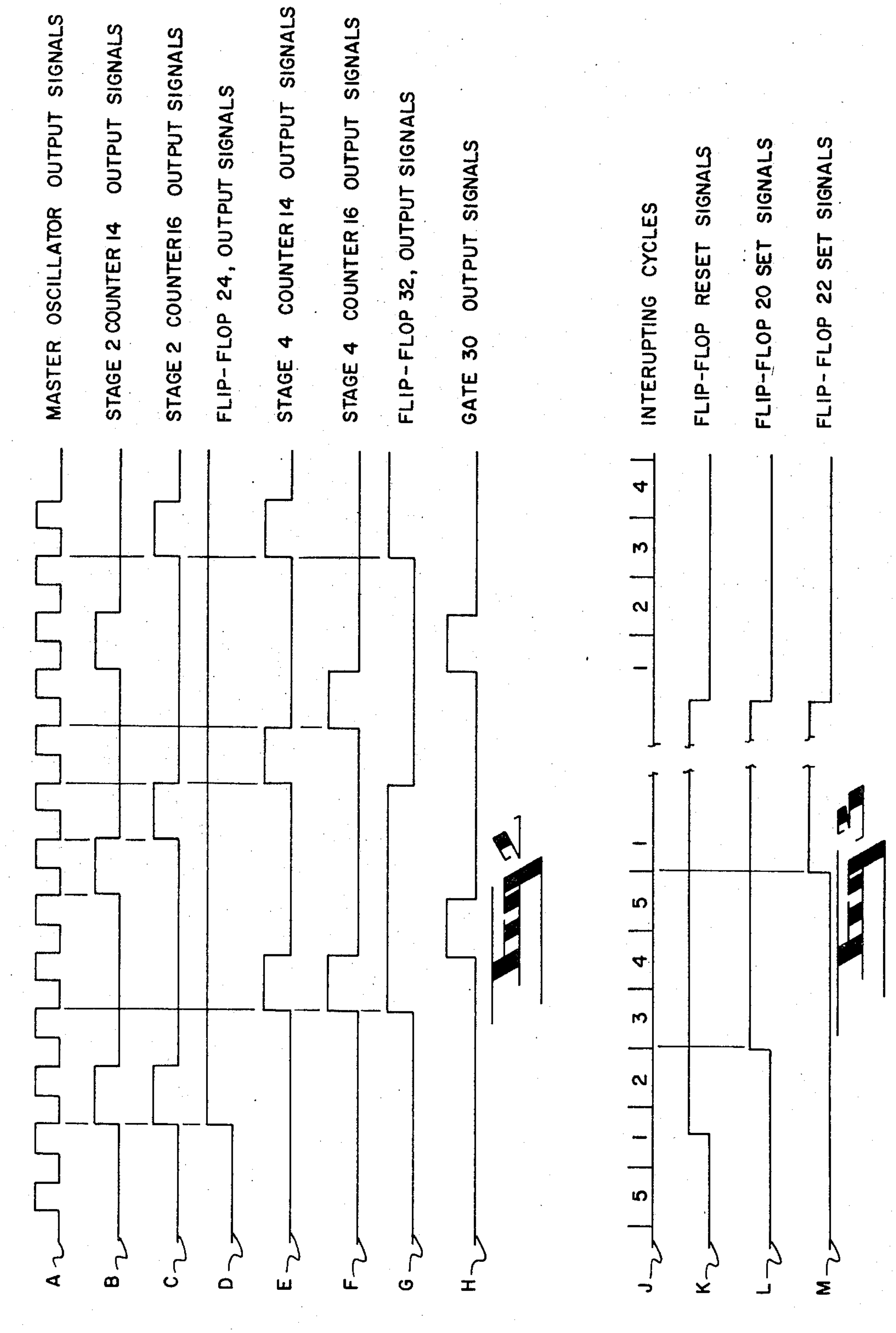

The present invention may be more readily described by reference to the accompanying drawings in which:

FIG. 1 is a simplified block diagram of a timing system for use in a real time data processing system constructed in accordance with the teaching of the present invention; and FIGS. 2 and 3 are timing charts of various waveforms useful in explaining the operation of the present invention.

The present invention relates to data processing systems and more particularly to a synchronized timing arrangement utilizing timing signals having more than one frequency. Since it is believed to be unnecessary to describe the well-known details of these timing arrangements to completely describe the invention, block diagrams will be used where possible. However, even though known details will be eliminated, a basic description of the entire timing system will be presented to enable one skilled in the art to understand the use of the present invention.

Accordingly, reference is made to FIG. 1 which shows a simplified block diagram of the timing arrangement disclosed wherein a master oscillator 12 is provided for generating a signal having a frequency which is a multiple of the frequencies of each of the signals used in the system. The signal from master oscillator 12 is coupled to a pair of frequency divider circuits such as ring counters 14 and 16. A ring counter, as used herein, is a loop of interconnected bistable elements, or stages, each of which provides temporary storage of a binary digit. Each stage operates in either one of two stable states and transfers from the state in which it is operating to the other stable state upon application of a trigger signal to the counter. In one state of operation, the bistable stage represents the binary 1 (stores a 1-bit) and in the other state the bistable stage represents the binary 0 (stores a 0-bit). The ring counter is designed so that at any given time one and only one stage stores a 1-bit. As trigger signals are applied to the counter, the 1-bit moves in an ordered sequence around the loop.

The leads entering the left-hand side of the counter symbols shown in FIG. 1 provide the trigger signals. Thus, in counter 14 a 1-bit stored in stage 1 moves sequentially from stage 1 to 2, 3, 4 and back to stage 1 as trigger signals are applied to counter 14. Signals from stage 4 in counter 14 have a frequency equal to one-fourth the frequency of the trigger signals applied to counter 14. In a similar manner, a 1-bit circulating through counter 16 provides a signal in stage 4 having a frequency equal to one-fifth the frequency of the trigger signals applied to the left-hand side of counter 16. A third counter 18 also divides the frequency of the signal entering the left-hand side of the symbol by 5.

A plurality of AND-gates and a plurality of flip-flops provide control so that the two frequencies at the output terminals shown at the right-hand side of FIG. 1 have the proper phase relationship to each other. These gates and flip-flops enable and disable the counters so that a predetermined number of bits are transferred into and out of the memory of a data processor (not shown). The flip-flop or bistable multivibrator described herein is a circuit adapted to operate in either one of two stable states and to transfer from the state in which it is operating to the other stable state upon application of a trigger signal thereto. In one state of operation, the flip-flop represents the binary 1 (1-state) and in the other state, the binary 0 (0-state). The two leads entering the left-hand side of the flip-flop symbol shown in FIG. 1 provide the input signals. The upper input lead, the set lead, provides a set signal and the lower input lead, the reset input lead provides a reset input signal. When the set input signal goes positive, the flip-flop is transferred to its 1-state if it is not already in the 1-state. When the reset input signal goes positive, the flip-flop is transferred to its 0-state if it is not already in the 0-state. The two leads leaving the right-hand side of the flip-flop symbols deliver the two output signals. The upper output lead, the 1 output lead, delivers the 1 output signal of the flip-flop and the lower output lead, the 0 output lead delivers a 0 output signal.

The AND-gates disclosed in FIG. 1 provide the logical operation of conjunction for binary 1 signals applied thereto. In the system disclosed, a binary 1 (1-bit) is represented by a positive signal, and the AND-gate provides a positive output signal representing a binary 1 when, and only when, all of the input signals applied thereto are positive and represent binary 1's. The symbol identified by reference numerals 26, 28, and 30 in FIG. 1 are AND-gates each having two input terminals. Such AND-gates deliver a binary 1 output signal only when both of the input signals applied thereto represent a binary 1.

A pulse pedestal flip-flop 32 provides a gating function and acts as a frequency divider for the timing pulses produced by ring counter 14. Pulse pedestal flip-flop 32 is a circuit similar to the flip-flop circuits 20, 22, and 24 in that it transfers to its reset state when a positive signal is applied to the reset terminal. Pulse pedestal flip-flop 32 differs from these other flip-flops in that it alternates between the set state and the reset state when positive pulses are applied to the trigger input terminal when no signal is applied to the reset terminal. A first pulse applied to the trigger input causes flip-flop 32 to change from the reset condition to the set state, while a second pulse applied to trigger terminal causes flip-flop 32 to transfer from its set state to its reset state. Thus, the output of flip-flop 32 will be a series of clocking pulses having a frequency one-half of the frequency of the signals applied to the trigger input terminal. These pulses are used for various timing operations in the data processor. As shown in FIG. 1, they are also applied to a delay circuit 40 which generates trigger signals for counter 18.

As long as reset switch 34 is closed by spring 35, a positive voltage applied to terminal 36 holds flip-flops 20 and 22 in their reset or 0-states. With flip-flop 22 reset, flip-flop 24 remains in its given state.

When the 1-bits circulating in ring counters 14 and 16 simultaneously reach stage 2 of each counter, signals having positive voltages are applied to both input terminals of AND-gate 26 causing conjunction to occur. AND-gate 26 then generates an output signal which reset flip-flop 24. Resetting of flip-flop 24 generates an enabling signal for one terminal of AND-gate 30. Each time a 1-bit appears at stage 4 of counter 16, a signal is generated which is applied through a pulse stretcher circuit 38 to the other terminal of AND-gate 30. Since conditions for conjunction in AND-gate 30 are now satisfied an output signal is generated.

A pulse stretcher circuit of the type disclosed, generates an output pulse or signal having a predetermined minimum duration when a pulse or signal having a shorter duration is applied thereto. Due to the high frequency of master oscillator 12, pulses produced by it may not have the duration needed by the associated peripheral equipment coupled to the output of AND-gate 30. Thus, pulse stretcher 38 is employed to provide pulses having the proper duration.

At the same time that AND-gate 30 is providing a series of clock output pulses for the peripheral equipment associated with it, pulse pedestal flip-flop 32 is providing clock output pulses, having a different frequency, for the data processor. Since flip-flop 24 is reset, flip-flop 32 is not held reset and continues to provide a series of clock output pulses for the data processor, including counter 18.

Counter 18 synchronizes various timing operations including interrupting cycles of the data processor. It is important that these timing operations and particularly the interrupting cycles start with given counts and end with given counts of counter 18. The interrupting cycles as disclosed herein are determined by the location of the 1-bit in counter 18, with count 1 and interrupting cycle 1 occurring when the 1-bit is in stage 1. The timing operation of this particular embodiment should begin with count 1 and end a number of cycles later with count 5.

When it is desired to reset counter 18 to count 1 and to resynchronize the output of flip-flop 32, resent switch 34 is momentarily opened. The frequency of the pulses applied to counter 18 is so high that several cycles would occur during the time that a manual switch of the type employed in FIG. 1 is depressed. When the 1-bit circulating in counter 18 reaches stage 3, an output signal is generated setting flip-flop 20. A 1 output signal from flip-flop 20 enables AND-gate 28. When the 1-bit returns to stage 1 of counter 18, a signal is generated which is transferred to the second input terminal of AND-gate 28 causing conjunction in AND-gate 28 and the setting of flip-flop 22 to its 1-state. The output signal from the 1 terminal of flip-flop 22 is applied to a reset terminal of counter 18 which causes counter 18 to be reset so that the 1-bit is in stage 1. This same signal from the 1 output terminal of flip-flop 24 thereby setting flip-flop 24. When flip-flop 24 is set, a signal is applied to the reset terminal of the pulse pedestal flip-flop 32 thereby disabling flip-flop 32 so that a signal is no longer provided at the output terminal of flip-flop 32. The setting of flip-flop 24 disables AND-gate 30.

When reset switch 34 is again closed, flip-flop 20 and 22 are reset by the voltage of terminal 36. There is no longer a positive voltage at the 1 output terminal of flip-flop 22 so flip-flop 24 is no longer held set. When the 1-bits circulating in counters 14 and 16 simultaneously reach stage 2 of each counter, signals are generated which when applied to AND-gate 26 cause conjunction therein resulting in an output signal which resets flip-flop 24. This causes flip-flop 32 and AND-gate 30 to provide output pulses when the bits reach stage 4 of counters 14 and 16 and cause counter 18 to circulate a 1-bit as described above.

The 1-bit in counter 18 starts from stage 1 to provide interrupting cycle 1 for the data processor at the same time that the first output pulses are provided by flip-flop 32 and AND-gate 30. Thus, each time the reset switch 34 is depressed, the data processor is allowed to complete the operations through interrupting cycle 5 and is reset to cycle 1. When the output pulses are again delivered by flip-flop 32 and AND-gate 30, these pulses will have a predetermined phase relationship. Also, the data processor will start operation with cycle 1.

The operation of the timing system may be more clearly seen by reference to the timing charts shown in FIGS. 2 and 3.

Waveform A illustrates graphically the timing pulses provided by the master oscillator 12.

Waveforms B and C illustrate graphically the output timing pulses of stage 2 of counters 14 and 16 respectively.

Waveform D illustrates graphically the signal at the 0 output terminal of flip-flop 24.

Waveforms E and F illustrate graphically the output timing pulses of stage 4 of counters 14 and 16 respectively.

Waveform G illustrates graphically the output pulses of flip-flop 32.

Waveform H illustrates graphically the output pulses of AND-gate 30.

Waveform J illustrates graphically the position of the 1-bit in the stages of counter 18.

Waveform K illustrates graphically the voltage applied to the reset terminals of flip-flops 20 and 22.

Waveform L illustrates graphically the voltage applied to the set terminal of flip-flop 20.

Waveform M illustrates graphically the voltage applied to the set terminal of flip-flop 22.

While the principles of the invention have now been made clear in an illustrative embodiment, there will be immediately obvious to those skilled in the art many modifications of structure, arrangement, proportions ,the elements, materials, and components, used in the practice of the invention, and otherwise, which are particularly adapted for specific environments and operating requirements without departing from those principles.

What is claimed is:

1. A system for generating and controlling the phase relationship of a first and a second series of signals, said system comprising: a device for providing signals having a given frequency; first and second frequency divider circuits, each of said circuits being coupled to said device for generating signals having a frequency which is a submultiple of the frequency of the signals of said device; first and second gating means, said first gating means being coupled to the first of said circuits and said gating means being coupled to the second of said circuits; and a third means for controlling the phase relationship of the signals of each of said circuits, said third means being coupled to said first and said second frequency divider circuits, said third means being coupled to selectively enable said first and second gating means when the signals of said circuits have a predetermined phase relationship.

2. A system for generating and controlling the phase relationship of a first and a second series of signals, said system comprising: a device for providing signals having a given frequency; first and second frequency divider circuits, each of said circuits being coupled to said device for generating signals having a different frequency which is a submultiple of the frequency of the signals of said device; first and second gating means, said first gating means being coupled to the first of said circuits and said second gating means being coupled to the second of said circuits; and a third means for controlling the phase relationship of the signals of each of said circuits, said third means being coupled to said first and said second frequency divider circuits, said third means being coupled to enable said first and second gating means when the signals of said circuits have a predetermined phase relationship.

3. A system for generating and controlling the phase relationship of a first and a second series of recurrent pulsed signals, said system comprising: a device for providing pulsed signals having a given frequency; first and second counter circuits, each of said circuits being coupled to said device for generating a sequence of pulsed signals having a different frequency which is a submultiple of the frequency of the signals of said device; first and second gating means, said first gating means being coupled to the first of said circuits and said second gating means being coupled to the second of said circuits; and a third counter circuit for controlling the phase relationship of the signals of each of said circuits, said third counter circuit being coupled to enable said first and second gating means when the signals of said circuits have a predetermined phase relationship.

4. A system for generating and controlling the phase relationship of a first and a second series of recurrent pulsed signals, said system comprising: a device for providing pulsed signals having a given frequency; first and second counter circuits, each of said circuits being coupled to said device for generating a sequence of pulsed signals having a different frequency which is a submultiple of the frequency of the signals of said device; first and second gating means, said first gating means being coupled to the first of said circuits and said second gating means being coupled to the second of said circuits; and a third counter circuit for controlling the phase relationship of the signals of each of said circuits, said third counter circuit being coupled to selectively enable said first and second gating means thereby causing the signals of said circuits to have a predetermined phase relationship.

5. A system for generating and controlling the phase relationship of a first and a second series of recurrent pulsed signals, each of said series of signals having a different frequency, said system comprising: a device for providing pulsed signals having a given frequency; first and second counter circuits, each of said circuits being coupled to said device for generating a sequence of pulsed signals having a frequency which is a submultiple of the frequency of the signals of said device; first and second gating means, said first gating means being coupled to the first of said circuits and said second gating means being coupled to the second of said circuits; and a third counter circuit for controlling the phase relationship of the signals of each of said circuits, said third counter circuit being coupled to said first and second gating means for enabling said first and second gating means when the signals of said circuits have a predetermined phase relationship and for disabling said first and second gating means when the signals of said circuits have a different phase relationship.

6. A system for generating and controlling the phase relationship of a first and a second series of pulsed signals, said system comprising: a device for providing signals having a given frequency; first and second frequency divider circuits; each of said circuits being coupled to said device for generating signals having a different frequency which is a submultiple of the frequency of the signals of said device; first and second gating means, said first gating means being coupled to the first one of said circuits and said second gating means being coupled to the second one of said circuits; and a third means for checking the phase relationship of the signals of said first and said second circuits, said third means being coupled to enable said first and second gating means when the pulses of said circuits have a predetermined phase relationship.

7. A system for generating and controlling the phase relationship of a first and a second series of pulsed signals, said system comprising: a device for providing signals having a given frequency; first and second ring counter circuits, each of said circuits being coupled to said device for generating signals having a different frequency which is a submultiple of the frequency of the signals of said device; first, second and third gating means, said first gating means being coupled to the first of said circuits, said second gating means being coupled to the second of said circuits, said third means being coupled to said first and second circuits and said second gating means, said third means upon the concurrence of pulses of said first and said second circuits causing said third means to deliver a signal to simultaneously enable said first and second gating means thereby synchronizing the phase relationship of the output signals of said first and second gating means.

8. A system for generating and controlling the phase relationship of a first and a second series of recurrent pulsed signals, said system comprising: a device for providing pulsed signals having a given frequency; first and second counter circuits, each of said circuits being coupled to said device for generating a sequence of pulsed signals having a different frequency which is a submultiple of the frequency of the signals of said device; first and second gating means, said first gating means being coupled to the first of said circuits and said second gating means being coupled to the second of said circuits; and a third counter circuit for controlling the phase relationship of the signals of each of said circuits, said third counter circuit being selectively coupled to said first and second gating means to enable said first and second gating means when the signals of said circuits have a predetermined phase relationship, said third counter circuit being coupled to receive signals from said first gating means, said third counter circuit disabling said first and said second gating means when said third counter circuit is in a predetermined state.

9. A system for generating and controlling the phase relationship of a first and a second series of signals, said system comprising: a device for providing signals having a given frequency; first and second counter circuits, each of said circuits being coupled to said device for generating a sequence of signals having a different frequency which is a submultiple of the frequency of the signals of said device; first and second gating means, said first gating means being coupled to the first of said circuits and said second gating means being coupled to the second of said circuits; a third counter circuit for controlling the phase relationship of the signals of each of said circuits, said third counter circuit being coupled to said first and second gating means for enabling said first and second gating means when the signals of said circuits have a predetermined phase relationship, said third counter circuit being coupled to receive signals from said first gating means; and means for applying a resetting voltage to said first and said second gating means, said third counter circuit disabling said first and said second gating means when said third counter circuit is in a predetermined state if said resetting voltage is applied.

References Cited

UNITED STATES PATENTS

| | | | |
|---|---|---|---|
| 3,226,648 | 12/1965 | Davidson | 328—72 X |
| 3,267,474 | 8/1966 | Greenlee. | |
| 3,292,034 | 12/1966 | Braaten | 328—72 X |
| 3,359,367 | 12/1967 | Hiatt | 328—63 X |

MAYNARD R. WILBUR, *Primary Examiner.*

GREGORY J. MAIER, *Assistant Examiner.*

U.S. Cl. X.R.

328—63